E. P. ERICKSON.
SWINGING FAUCET.
APPLICATION FILED SEPT. 16, 1920.
1,403,396.
Patented Jan. 10, 1922.
2 SHEETS—SHEET 1.
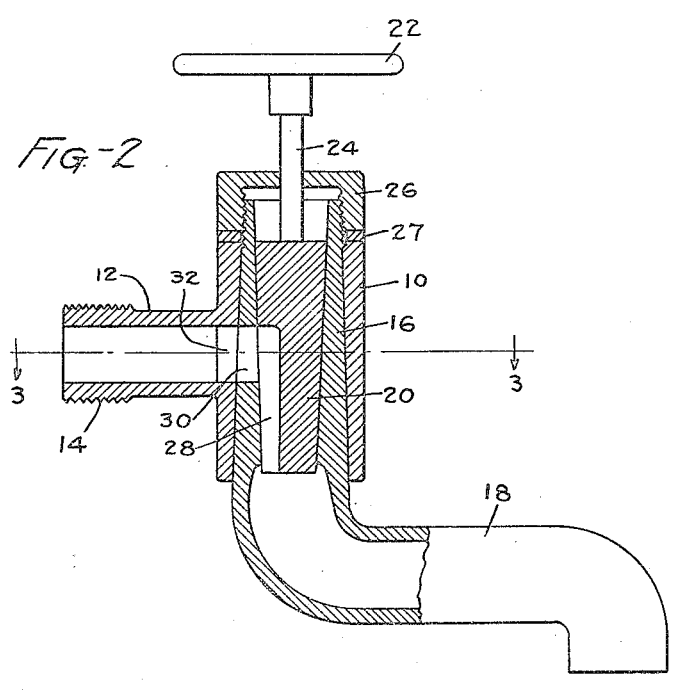
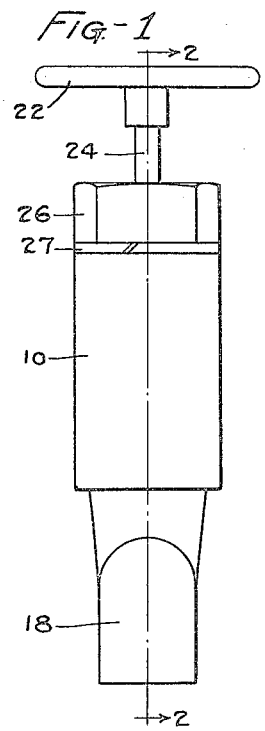
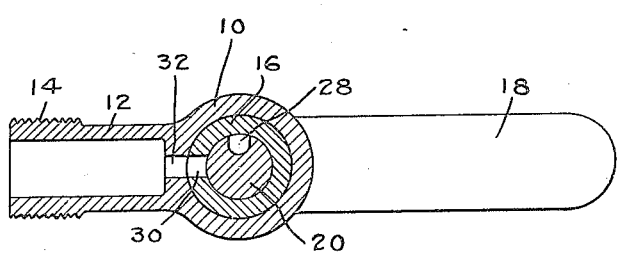
INVENTOR:
ERICK P. ERICKSON.
BY Whiteley and Ruckman
ATTORNEYS.

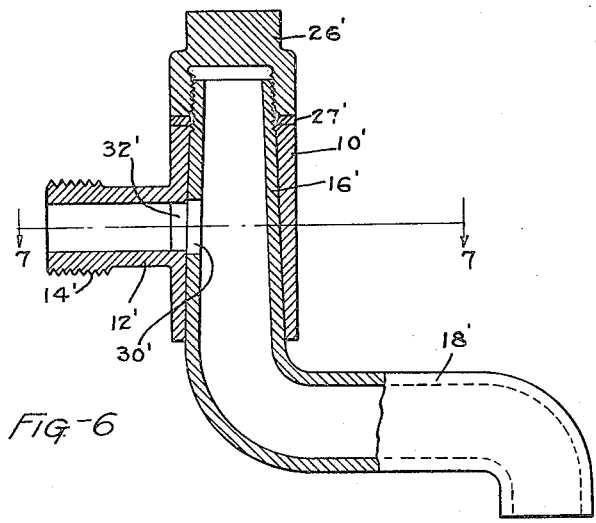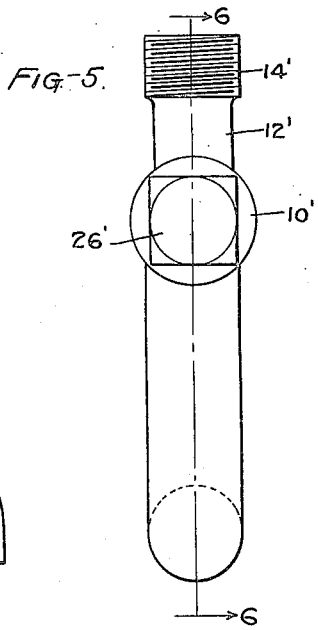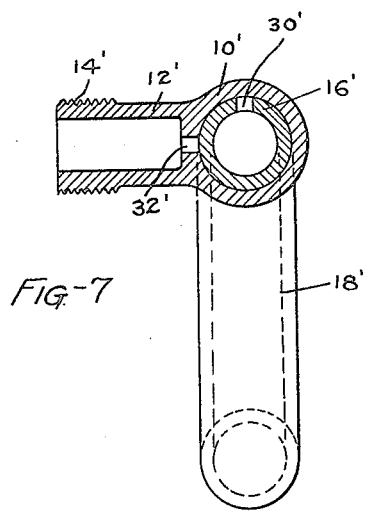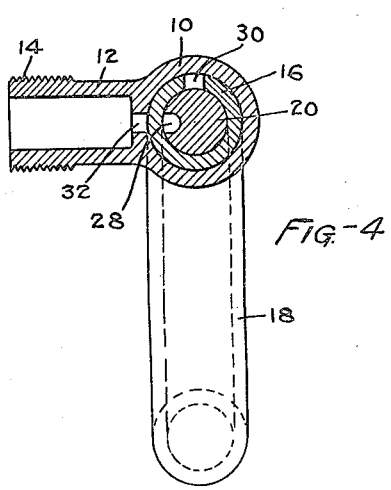

UNITED STATES PATENT OFFICE.

ERICK P. ERICKSON, OF GROVE CITY, MINNESOTA.

SWINGING FAUCET.

1,403,396.　　　　Specification of Letters Patent.　　Patented Jan. 10, 1922.

Application filed September 16, 1920. Serial No. 410,609.

*To all whom it may concern:*

Be it known that I, ERICK P. ERICKSON, a citizen of the United States, residing at Grove City, in the county of Meeker and State of Minnesota, have invented certain new and useful Improvements in Swinging Faucets, of which the following is a specification.

My invention relates to swinging faucets, and an object is to provide a faucet in which the supply of water or other liquid is shut off by the act of swinging the projecting end of the faucet so that it will be out of the way.

The full objects and advantages of my invention will appear in connection with the detailed description thereof, and the novel features embodied in my inventive idea will be particularly pointed out in the claims.

In the accompanying drawings which illustrate my invention in one form,—

Fig. 1 is a front elevational view of one form of my invention. Fig. 2 is a view in vertical section on the line 2—2 of Fig. 1. Fig. 3 is a view in horizontal section on the line 3—3 of Fig. 2. Fig. 4 is a view in horizontal section taken similarly to Fig. 3 but showing the faucet turned into shut-off position. Fig. 5 is a top plan view of a modified form. Fig. 6 is a view in vertical section on the line 6—6 of Fig. 5. Fig. 7 is a view substantially on the line 7—7 of Fig. 6 but with the faucet turned into shut-off position.

Referring to the construction shown in Figs. 1 to 4, the numeral 10 designates a hollow body member open at top and bottom and having an integral connected pipe section 12 provided at its rear portion with screw-threads 14 for attachment to a water pipe. The inner surface of the member 10 is tapered outwardly in a downward direction to receive the correspondingly tapered outer surface of the vertical portion 16 of a discharge member having an off-set portion 18. The inner surface of the vertical portion 16 is tapered inwardly in a downward direction to receive the correspondingly tapered surface of a plug 20 which is rotatably mounted in the portion 16 and in order that it may be rotated is provided with a handle 22 which is connected to the plug by a stem 24 extending through a cap 26 screw-threaded upon the upper end of the portion 16. There is a spring washer 27 between the cap 26 and the member 10. The plug 20 is provided in its outer surface with a recess 28 adapted in one position of the plug in the portion 16 to register with a hole 30 therein. The hole 30 is adapted in one position of the portion 16 to register with a passageway 32 at the forward end of the pipe section 12.

The operation and advantages of my invention will be obvious from the foregoing description. When the plug 20 and the discharge member are in the position shown in Fig. 2 a free passageway for water or other liquid is provided. When the plug 20 is turned into the position shown in Fig. 3, the supply of liquid will be shut off. Also, if the discharge member is turned into the position shown in Fig. 4, the supply will be shut off. This form of invention is adapted particularly for high pressure, since a shut-off in addition to the shut-off obtained by swinging the faucet is provided.

The form of invention shown in Figs. 5, 6, and 7 is substantially the same as that already described with the exception that the central plug is omitted. The numeral 10' designates a hollow body member open at top and bottom, and having integral connected pipe section 12' provided at its rear with screw-threads 14' for attachment to a water pipe. The inner surface of the member 10' is tapered outwardly in a downward direction to receive the correspondingly tapered outer surface of the vertical portion 16' of a discharge member having an off-set portion 18'. A cap 26' is screw-threaded upon the upper end of portion 16' and the latter is provided with a hole 30' adapted in one position to register with a passageway at the forward end of the pipe section 12'. There is a spring washer 27' between the cap 26' and the member 10'. This form of the invention is adapted particularly for low pressure. The supply of liquid is shut off when the discharge member is swung from the position shown in Fig. 6 to that shown in Fig. 7.

I claim:

1. A swinging faucet comprising a hollow body member, means for attaching said body member to a water pipe, a hollow discharge member having a vertical portion rotatably mounted in said body member and having an off-set portion which, when swung out of the way, rotates said first mentioned portion to bring a lateral hole therein out of register with a passageway connected with the water-pipe, and a plug rotatably mounted in said vertical portion, said plug having a recess which in one position thereof registers with said lateral hole.

2. A swinging faucet comprising a hollow body member, the inner surface of which is tapered outwardly in a downward direction, means for attaching said body member to a water pipe, a hollow discharge member having a vertical portion whose outer surface is correspondingly tapered to rotatably fit within said body member, and having an offset portion which, when swung out of the way, rotates said first mentioned portion to bring a lateral hole therein out of register with a passageway connected with the water-pipe, a cap screw-threaded upon the upper end of said first mentioned portion, and a plug rotatably mounted in said vertical portion, said plug having a recess which, when in one position thereof, registers with said lateral hole.

In testimony whereof I hereunto affix my signature.

ERICK P. ERICKSON.